United States Patent
Tazime et al.

(10) Patent No.: US 7,912,565 B2
(45) Date of Patent: Mar. 22, 2011

(54) METHOD FOR CREATING AND ACCESSING A MENU FOR AUDIO CONTENT WITHOUT USING A DISPLAY

(75) Inventors: Nour-Eddine Tazime, Noyal sur Vilaine (FR); Jean-Ronan Vigouroux, Rennes (FR); Izabela Grasland, Bréteil (FR)

(73) Assignee: Thomson Licensing, Boulogne Billancourt (FR)

( * ) Notice: Subject to any disclaimer, the term of this patent is extended or adjusted under 35 U.S.C. 154(b) by 933 days.

(21) Appl. No.: 10/541,577

(22) PCT Filed: Nov. 24, 2003

(86) PCT No.: PCT/EP03/13164
§ 371 (c)(1),
(2), (4) Date: Jul. 6, 2005

(87) PCT Pub. No.: WO2004/061848
PCT Pub. Date: Jul. 22, 2004

(65) Prior Publication Data
US 2006/0293771 A1 Dec. 28, 2006

(30) Foreign Application Priority Data
Jan. 6, 2003 (EP) .................................... 03290019

(51) Int. Cl.
*G06F 17/00* (2006.01)
*G06F 17/30* (2006.01)
(52) U.S. Cl. ......................................... 700/94; 707/737
(58) Field of Classification Search ................... 700/94; 707/737, 736; 715/978
See application file for complete search history.

(56) References Cited

U.S. PATENT DOCUMENTS 6,225,546 B1 * 5/2001 Kraft et al. ..................... 84/609
6,278,446 B1 * 8/2001 Liou et al. ..................... 715/700
6,748,395 B1 * 6/2004 Picker et al. .................. 707/102
(Continued)

FOREIGN PATENT DOCUMENTS
DE 19608514 9/1997
(Continued)

OTHER PUBLICATIONS

Ferhatosmanoglu, H.; Tuncel, E.; Agrawal, D.; El Abbadi, A., "Approximate nearest neighbor searching in multimedia databases," Data Engineering, 2001. Proceedings. 17th International Conference on , vol., No., pp. 503-511, 2001.*
(Continued)

*Primary Examiner* — Vivian Chin
*Assistant Examiner* — Joseph Saunders, Jr.
(74) *Attorney, Agent, or Firm* — Robert D. Shedd; Paul P. Kiel

(57) ABSTRACT

A method for creating a menu for audio content, e.g. music tracks, uses means for classifying the audio content into clusters of similar tracks, the similarity referring to physical, perceptual and psychological features of the tracks. The method comprises a means for automatic representative selection for clusters, and a means for generating thumbnail representations of audio tracks. Said audio thumbnails are associated to the menu. Advantageously, no graphical or textual display is required for navigation, since the user may listen to an audio thumbnail and then enter a command, e.g. by pressing an appropriate button, for either listening to the related track or a similar track belonging to the same cluster, or listening to another type of music by selecting another thumbnail representing another cluster.

24 Claims, 1 Drawing Sheet

U.S. PATENT DOCUMENTS

| | | | |
|---|---|---|---|
| 6,987,221 B2 * | 1/2006 | Platt | 84/601 |
| 7,003,515 B1 * | 2/2006 | Glaser et al. | 707/5 |
| 7,043,477 B2 * | 5/2006 | Mercer et al. | 707/7 |
| 7,072,846 B1 * | 7/2006 | Robinson | 705/10 |
| 7,139,469 B2 | 11/2006 | Kim et al. | |
| 7,149,755 B2 * | 12/2006 | Obrador | 707/104.1 |
| 7,277,766 B1 * | 10/2007 | Khan et al. | 700/94 |
| 2003/0158737 A1 * | 8/2003 | Csicsatka | 704/273 |

FOREIGN PATENT DOCUMENTS

| | | |
|---|---|---|
| FR | 2602352 | 2/1988 |
| JP | 7-45050 | 2/1995 |
| JP | 2000-331422 | 11/2000 |
| JP | 2001-273745 | 10/2001 |
| JP | 2003-317436 | 11/2003 |
| JP | 2004-152327 | 5/2004 |

OTHER PUBLICATIONS

E. Pempalk et al.: "Content-based Organization and Visualization of Music Archives" Proceedings of the 10th ACM Int'l Conference on Multimedia, Dec. 1, 2002. pp. 570-579.

D. Pye: "Content-based methods for the management of digital music", Proceedings of 2000 Int'l Conference on Acoustics, Speech and Signal Processing. vol. 6, Jun. 5, 2000, pp. 2437-2440.

A. Rauber et al: "Automatically Analyzing and Organizing Music Archives", 5th European Conference on Research and Advanced Technology for Digital Libraries, Sep. 4, 2001, pp. 402-414.

Search Report Dated May 11, 2004.

* cited by examiner

METHOD FOR CREATING AND ACCESSING A MENU FOR AUDIO CONTENT WITHOUT USING A DISPLAY

This application claims the benefit, under 35 U.S.C. §365 of International Application PCT/EP03/13164, filed Nov. 24, 2003 which was published in accordance with PCT Article 21(2) on Jul. 22, 2004 in English and which claims the benefit of European patent application No. 03290019.3, filed Jan. 6, 2003.

This invention relates to an audio management system that allows a user to browse through stored audio files in a very natural way. The invention concerns large-capacity digital storage-playback systems for audio content like MPEG audio layer 3 (MP3) players.

BACKGROUND

Driven by the recent advances in the technologies of digital storage and audio compression, the problem of managing very big collections of audio files becomes predominant. For instance, the current generation of MP3 players contains a 10 GB hard disk drive which enables users to store e.g. more than 300 hours of MP3PRO music, meaning more than 4.000 titles.

Reliable tools are required to make those collections accessible to the users.

The classical way of indexing audio files is based on textual meta-information like title, artist, album or genre, like e.g. ID3 tags for MP3 audio files.

There are some drawbacks with this kind of organization:
1. The metadata are textual and not audio, and therefore cannot give a precise representation of an audio content, like a representative extract of the content can do.
2. Organization sorted by genre or by artist allows users to locate a particular piece of music. This presupposes that users have well-defined goals, knowing exactly what they want to hear. The users searching strategy must be goal-driven and deterministic.
3. There are a lot of genres: for instance, the music archive mp3.com currently lists its titles under 180 different sub-genres, organized in 16 main genres. It is difficult for a user to navigate in such organization.
4. Genres are sometimes subjective because they are established a priori and not deduced from the content itself. Sometimes they are difficult to interpret.
5. A classification by genres is not able to satisfy very simple user needs like for instance "This piece of music is relaxing me. I would like to hear more like this".

The present invention is directed to overcoming these drawbacks.

INVENTION

The present invention deals with a process and system for navigating through a large amount of audio files, e.g. MP3 files, using brief representatives of the audio content. Before a user selects a music track, he can benefit from hearing a brief representative excerpt, in the following referred to as "audio thumbnail". An audio thumbnail is of sufficient length to recognize the music, e.g. 5 or 6 seconds.

The stored audio files are preprocessed in order to extract some relevant and objective descriptors. According to the invention, these descriptors are used to cluster the music tracks into perceptually homogeneous groups. From each cluster a relevant track is selected automatically or manually, or semi-automatically, and from said selected track an audio thumbnail is extracted. Then these audio thumbnails being key phrases are arranged in a tree data structure, or table of contents, that enables the user to navigate without any visual navigation means, like display.

Furthermore, the audio thumbnails allow the user to navigate perceptually through the audio database, without having to remember textual elements, like title or artist names. It is particularly suited to enable users without precise idea of what they want to hear to browse their database, and to select perceptually from clusters of songs. Perceptually means here that the thumbnails address to the perception, and not memory, of users. Also, said clusters are perceptive, meaning that the structuring of the clusters is relevant for users, and thus said structuring meets real user needs.

Using this invention, users can create play lists beyond the classical music categories like pop or country.

BRIEF DESCRIPTION OF THE DRAWINGS

Exemplary embodiments of the invention are described with reference to the accompanying drawings, which show in FIG. 1 an exemplary architecture of an audio reproduction system using an audio menu.

DETAILED DESCRIPTION OF THE INVENTION

Figure 1:
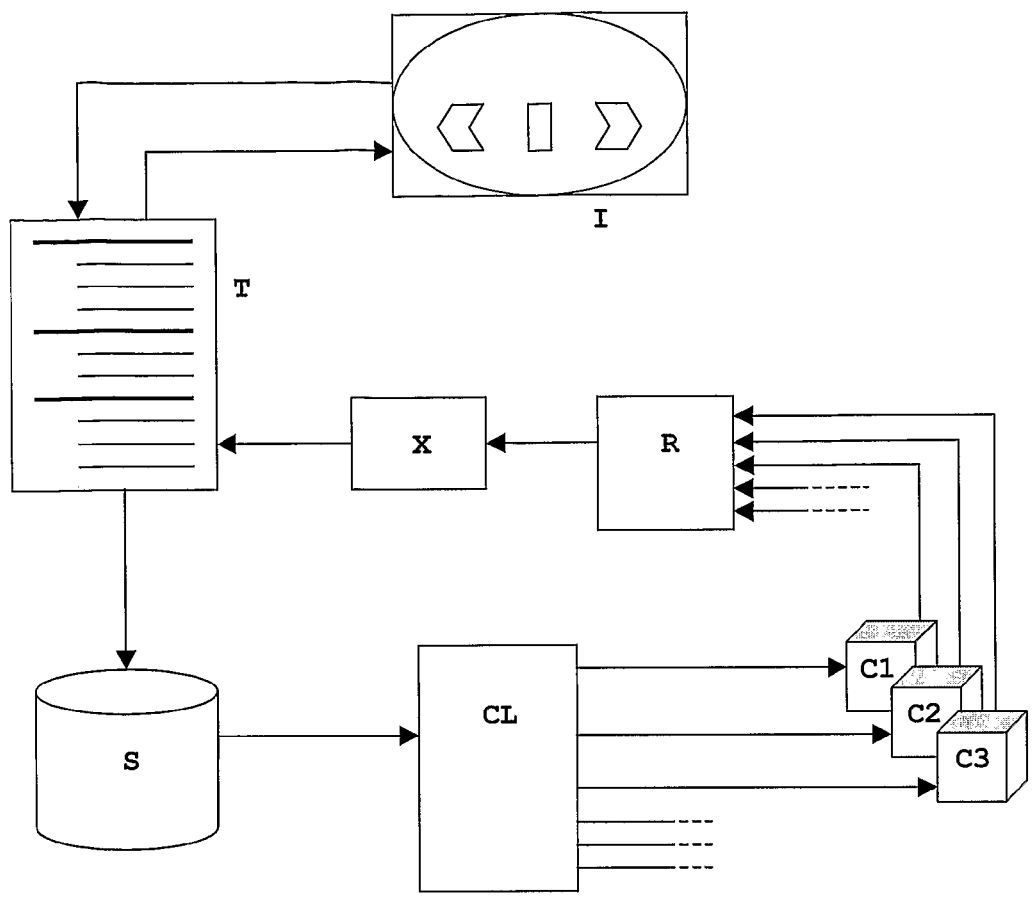

The present invention describes a method for creating, organizing and using audio representations for audio content. The structure of the invention is shown in FIG. 1. Audio tracks, usually music, are stored in a storage means S. The tracks are classified in a classifier CL and associated to a cluster of tracks C1,C2,C3. For each cluster a representative example is selected in a representative selector R. Further, an extractor X extracts a characteristic sample, or thumbnail, from said example, and the thumbnail is associated to a table of contents T. The user uses an interface I to select a first cluster represented by a first thumbnail, listen to the selected thumbnail, and decide whether to select another cluster, or select said first cluster related to said first thumbnail and then select a track belonging to said cluster, which track is then read from the storage means S and reproduced.

Advantageously, this approach is more perception based than previous methods, and therefore more convenient to the user. An audio-based indexing system according to the invention combines two methods that are known from other content search systems, namely the 'table-of-contents' method and the 'radio-like navigation' method.

The 'table-of-contents' method relates to a books table of contents, where short representative sequences summing up the actual text are grouped according to the structure of the books contents. This usually correlates with a logical classification into topics. Using this method for audio content means extracting parameters, or descriptors, from the audio file, following objective criteria defined below, and then group together homogeneous tracks in clusters. From a user's point of view, these clusters make sense because their content-based nature is going farther than the a priori classification in genres. E.g. all the fragments of guitar music, coming from all genres, may be grouped together in a cluster. All the relaxing music can constitute another cluster. According to the invention, the different clusters constitute the "table of contents" of the database. And, like in a book's table of contents, there may be different levels of details, like e.g. chapter 1, chapter 1.1, etc. Like the reader can navigate from chapter to chapter, and may decide to read a chapter more in detail, the listener can navigate from cluster to cluster, or may decide to listen to more, similar music from a cluster.

The 'radio-like navigation' method relates to typical user behavior when listening to the radio. Content browsing in this context is e.g. the user scanning the FM band on a car radio, and listening to a track or switching to the next station. The invention uses this concept, with a radio station corresponding to a cluster of tracks. Then 'switch to another station' corresponds to 'select another cluster', and 'listen to a track' corresponds to 'listen to this track or to a similar track from the same cluster'.

In the following, the afore mentioned steps in creating and organizing audio representations are described in detail, the steps being performed when a track is newly added to the database, or when the database is reorganized.

In a first step descriptors are extracted from the audio track. Three types of descriptors are used, trying to be objective and still relevant for the user.

The first type of descriptors is low-level descriptors, or physical features, as being typical for signal processing methods. Examples are spectral centroid, short-time energy or short-time average zero-crossing.

The second type of descriptors is medium-level descriptors, or perceptual features, as being typically used by a musician. Examples are rhythm, e.g. binary or ternary rhythm, tonality, the kind of formation, e.g. voice or special instruments.

The third type of descriptors is high-level descriptors, or psychological and social features of the track, as being normal for the average user. Trying to minimize the subjective nature of these features, it is e.g. possible to classify music as being happy or anxious, calm or energetic. These characteristics can be assigned to a certain degree, or with a certain probability, to a piece of music, when e.g. descriptors of the previously described types are used. Also, a song can be highly memorable, can convey a certain mood or emotion, can remind the user of something, etc. This may be done automatically using supervised algorithms, i.e. with algorithms that require user interaction.

The second step consists of clustering the music tracks. Using the descriptors defined in the first step, the tracks can be classified into homogeneous classes. These classes are more valuable to a user than classifying music by artist or title. Unsupervised algorithms may be used to cluster the tracks into packets with similar properties. Examples of such algorithms are the K-means or Self Organizing Maps. A new cluster may be automatically generated when the dissimilarity of a newly added track, compared to existing clusters, reaches a certain minimum level, and in that case the newly added track will be associated with the new cluster.

At this point, the tracks are classified and therefore it is possible to create a table of contents. There is no sharp classification required, e.g. it is possible to have the same track in any number of clusters. For example, one cluster may be for guitar music, while another cluster may be for calm music, and a track matching both characteristics may be associated with both clusters. In this case, both clusters may contain a link to said audio track, but the track itself needs to be stored only once.

The third step consists of automatically selecting a representative track for each cluster. Advantageously, the most representative track for a cluster is selected, using classical medoid selection. A medoid is that object of a cluster whose average dissimilarity to all objects of the cluster is minimal. Said dissimilarity can e.g. be determined using the descriptors that were extracted during the first step.

In the fourth step an audio thumbnail is created and stored for the medoid track. In another embodiment of the invention an audio thumbnail may be created and stored also for other tracks. For thumbnail creation it is evaluated which criteria are the best to characterize an audio track by a short audio sequence, the audio sequence being long enough to recognize the track, e.g. 5 or 6 seconds. In one embodiment of the invention the length of thumbnails is constant, in a second embodiment the length of thumbnails can be modified, and in a third embodiment the length of thumbnails can vary from track to track, according to the tracks descriptors. Further, in one embodiment of the invention a thumbnail is an original sample from the track, or in another embodiment it is automatically synthesized from said track.

In the fifth step the audio thumbnails are listed in a virtual table, which can be scanned through by the user, like scanning through different radio stations. The table may be organized such that within a cluster the most relevant track, or medoid, will be found first when scanning through the table. Other tracks within a cluster may be sorted, e.g. according to relevance. Advantageously, no graphical or textual display is required for scanning through the table of contents. The structure of the table of contents may be as follows:

```
<table of content>
    <cluster 1>
        <key phrase for the most relevant song (medoid)>
        <key phrase for secondary song>
        <key phrase 3>
    <cluster 2>
    ...
</table of content>
```

Figure 2:
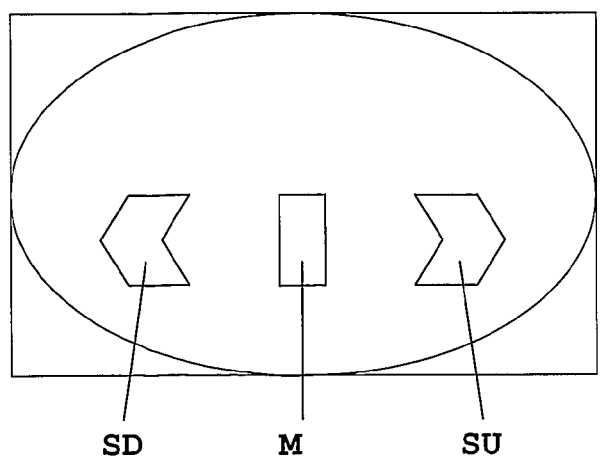
FIG. 2 an exemplary user interface without display.

A user may decide to listen to the current track, or to another track belonging to the same cluster and therefore being similar to said current track. Alternatively the user may decide to listen to a track from another cluster. Advantageously, only one button, or other means of command input, is required to operate the navigation system, namely for 'Switch Cluster'. More comfortable to the user is a device with three buttons, as shown in FIG. 2. One button SD is for 'Switch to a Near Cluster', one button SU is for 'Switch to a Distant Cluster', and one button M is for 'Switch to another track from the Current Cluster'. Alternatively, it is sufficient to have only one button, if the button has more than one function, or other means of user input. Other functions controlled by user input could be e.g. random track selection or random cluster selection mode. Another function could be to successively reproduce the representatives of all clusters until the user selects one cluster, said function being advantageous because the user needs not manually scan through the table of contents.

Further embodiments are described in the following.

In one embodiment of the invention an audio track belongs to only one cluster, while in another embodiment an audio track may belong to more than one cluster, when the respective class criteria are not excluding each other.

In one embodiment of the invention the table of contents has only one level of clustering, like in the previously described example, while in another embodiment the table of contents can have more hierarchical levels of clusters.

In one embodiment of the invention the classification rules for audio tracks are final, while in another embodiment said rules may be modified. Said modification may happen either by an update, e.g. via internet, or by any form of user interaction, e.g. upload to PC, edit and download from PC, or by statistical or self learning methods as used e.g. by artificial intelligence. This may be implemented such that an automatic or semi-automatic reclassification with modified or enhanced rules may be performed when e.g. the number of tracks associated with one cluster is much higher than the number of tracks associated with any other cluster.

In one embodiment of the invention thumbnails may be created only for tracks representing a cluster. In another embodiment of the invention thumbnails may be created also for other tracks, e.g. tracks that fulfill a certain condition like being selected very often or very rarely, or being very long. In a third embodiment thumbnails are created for all tracks.

In one embodiment of the invention the tracks within a cluster may have a constant order, so that the user can learn after a while when a certain track comes. The order can follow the tracks relevance, or any other parameter, e.g. storage time, or frequency of selection. In another embodiment of the invention the tracks within a cluster may be unordered, or appear randomly when the user selects a cluster.

In one embodiment of the invention there is a representative track selected for each cluster, while in another embodiment it may be useful to have no representative track for one of said clusters, e.g. a cluster for favorites or a cluster for tracks not being classifiable by the employed methods.

Advantageously the described method for perception based classification and retrieval of audio contents can be used in devices, preferably portable devices, for storage and reproduction of music or other audio data, e.g. MP3 players.

The invention claimed is:

1. A method for creating or accessing a menu for audio content stored in a storage means within a portable audio playback device without a display, the content consisting of audio tracks, and the menu containing representations of said audio tracks, wherein the portable audio playback device comprises a storage with stored audio tracks being clustered in a plurality of clusters and a navigation system having not more than three buttons, or one button with three button functions, wherein one button is for 'Switch to a Near Cluster', one button is for 'Switch to a Distant Cluster', and one button is for 'Switch to another track from the Current Cluster', the method comprising classifying the audio tracks into groups or clusters, wherein said classification is performed according to characteristic parameters of said audio tracks, wherein said characteristic parameters comprise physical features, perceptual features, and psychological features, wherein physical features comprise one or more of spectral centroid, short-time energy, or short-time average zero-crossing, and wherein perceptual features comprise one or more of rhythm and tonality;

detecting addition of a new audio track;

determining characteristic parameters of the new audio track;

determining that dissimilarity between the newly added track and existing clusters, according to said characteristic parameters used for classification, reaches at least a defined minimum level;

upon said determining, automatically creating a new, second cluster;

assigning the new audio track to said new, second cluster;

upon said creating the second cluster, classifying one or more further audio tracks of said audio tracks into the second cluster;

selecting automatically a first audio track as being a representative for the second cluster, wherein the medoid of the second cluster is selected;

automatically generating a reproducible audio extract from said first audio track; and associating said audio extract as representative of the second cluster to a menu list.

2. Method according to claim 1, wherein said characteristic parameters used for classification of audio content comprise one or more audio descriptors, the audio descriptors being either physical features, or perceptual features, or psychological or social features of the audio content.

3. Method according to claim 1, wherein an audio track can be classified into more than one cluster.

4. Method according to claim 3, wherein a track is classified into two clusters and both clusters contain a link to said track, and wherein the track is stored only once.

5. Method according to claim 1, wherein the audio tracks within a cluster have variable order, so that the user listens to a randomly selected track when having selected a cluster, with said track belonging to said cluster.

6. Method according to claim 1, wherein a user can modify the result of automatic classification of audio tracks.

7. Method according to claim 1, wherein a user can modify the classification rules for automatic classification of audio tracks.

8. Method according to claim 1, wherein the actual audio data are clustered within said storage means according to said menu.

9. Method according to claim 1, wherein the audio extract is a sample from the audio track.

10. Method according to claim 1, wherein audio extracts are created additionally for audio tracks not being representatives of clusters.

11. Method according to claim 1, wherein the length of audio extracts is not predetermined.

12. Method according to claim 1, wherein one of said clusters has no representative track.

13. Method according to claim 1, wherein said menu is hierarchical, such that a cluster may contain one or more subclusters.

14. Method according to claim 1, wherein the classification rules are modified automatically if a defined precondition is detected, and a reclassification may be performed.

15. Method according to claim 14, wherein said precondition comprises that the difference between the number of tracks in a cluster and the number of tracks in another cluster reaches a maximum limit value.

16. Method according to claim 14, wherein said precondition comprises that all stored tracks were classified into one cluster, and the total number of tracks reaches a maximum limit value.

17. Method according to claim 1, wherein the audio extract is an audio sequence being synthesized from the actual audio track rather than being an original sample.

18. Method according to claim 1, wherein said one or more further audio tracks classified into the second cluster were previously classified in a different first cluster, the method further comprising the steps of selecting automatically a second audio track being a representative for the first cluster, wherein the medoid of the first cluster is selected;

automatically generating a reproducible new audio extract from the second audio track; and associating said new audio extract of the second audio track as representative of the first cluster to the menu list.

19. Method according to claim 18, wherein another audio track was a representative of the first cluster before the new audio track was added, and said first audio track being representative of the second cluster is different from the another audio track that was representative of the first cluster before the new audio track was added.

20. An apparatus for creating or accessing a menu for audio content stored on a storage means, the content consisting of audio tracks, and the menu containing representations of audio tracks, the apparatus being within a portable audio playback device without a display for displaying the audio content and comprising means for classifying the audio tracks into groups or clusters, wherein said classification is performed according to characteristic parameters of said audio tracks;

a storage with stored audio tracks being clustered in a plurality of clusters;

means for detecting addition of a new audio track;

means for determining characteristic parameters of the new audio track, wherein said characteristic parameters comprise physical features, perceptual features, and psychological features, wherein physical features comprise one or more of spectral centroid, short-time energy, or short-time average zero-crossing, and wherein perceptual features comprise one or more of rhythm and tonality;

means for determining that, according to said determined characteristic parameters, dissimilarity between the newly added track and existing clusters reaches at least a defined minimum level;

means for automatically creating a new, second cluster upon said determining;

means for assigning the new audio track to said new, second cluster;

means for classifying one or more further audio tracks into the second cluster upon said second cluster being automatically created;

means for selecting automatically a first audio track as being a representative for the second cluster, wherein the medoid of the second cluster is selected;

means for automatically generating a reproducible audio extract from said first audio track;

means for associating said audio extract as representative of the second cluster to a menu list; and a navigation system having not more than three buttons, or one button with three button functions, wherein one button is for 'Switch to a Near Cluster', one button is for 'Switch to a Distant Cluster', and one button is for 'Switch to another track from the Current Cluster'.

21. Apparatus according to claim 20, further comprising means for selecting and reproducing a first audio extract from a the first cluster;

means for a first user input, the input controlling whether the cluster associated with the currently selected audio thumbnail is selected or not; and means for a second user input, the input controlling whether another cluster is selected or not.

22. Apparatus according to claim 20, further comprising means for reading an audio track of a selected cluster from said storage means for playback.

23. Apparatus according to claim 20, wherein said one or more further audio tracks classified into the second cluster were previously classified in a different first cluster, further comprising:

means for automatically selecting a second audio track being the medoid audio track of the first cluster;

means for automatically generating a reproducible audio extract from said second audio track; and means for associating said audio extract generated from the second audio track as representative of the first cluster to the menu list.

24. Apparatus according to claim 20, wherein the means for assigning at least one of the audio tracks of said first cluster to the second cluster uses the K-means algorithm to decide which audio tracks are assigned to the second cluster.

* * * * *